United States Patent
Lin (10) Patent No.: US 9,214,849 B2
(45) Date of Patent: Dec. 15, 2015

(54) HYBRID STEP MOTOR

(71) Applicant: Lin Engineering, Morgan Hill, CA (US)

(72) Inventor: Ted T. Lin, Saratoga, CA (US)

(73) Assignee: Lin Engineering, Morgan Hill, CA (US)

( * ) Notice: Subject to any disclaimer, the term of this patent is extended or adjusted under 35 U.S.C. 154(b) by 256 days.

(21) Appl. No.: 13/891,024

(22) Filed: May 9, 2013

(65) Prior Publication Data

US 2014/0333159 A1    Nov. 13, 2014

Related U.S. Application Data

(60) Provisional application No. 61/758,534, filed on Jan. 30, 2013.

(51) Int. Cl.
*H02K 37/00* (2006.01)
*H02K 37/20* (2006.01)
*H02K 37/10* (2006.01)

(52) U.S. Cl.
CPC ............... *H02K 37/20* (2013.01); *H02K 37/10* (2013.01)

(58) Field of Classification Search
CPC ....... H02K 37/00; H02K 37/20; H02K 37/04; H02K 37/10
USPC ................ 310/49.01–49.55, 12.01–12.33, 20
See application file for complete search history.

(56) References Cited

U.S. PATENT DOCUMENTS

| | | | |
|---|---|---|---|
| 3,757,150 A | | 9/1973 | Benezech |
| 3,855,486 A | * | 12/1974 | Binder et al. ............. 310/49.19 |
| 4,712,028 A | | 12/1987 | Horber |
| 4,963,775 A | | 10/1990 | Mori |
| 5,856,714 A | * | 1/1999 | Sugiura ..................... 310/49.16 |
| 5,994,806 A | * | 11/1999 | Aoki et al. ...................... 310/80 |
| 6,329,729 B1 | * | 12/2001 | Sakamoto ................. 310/49.33 |
| 6,891,296 B1 | | 5/2005 | Huang et al. |

* cited by examiner

*Primary Examiner* — Hanh Nguyen

(74) *Attorney, Agent, or Firm* — Thomas Schneck; Mark Protsik (57) ABSTRACT

A stepper motor is provided in which a permanent ring magnet is sandwiched in an outer part of the stator winding assembly located far from the gap between rotor and stator teeth, so that magnetic flux in the gap is dominated by the Ampere-turns of energized stator coils and therefore more easily controlled for reduced vibration at low stepping speeds. The rotor need not contain any permanent disk magnet. If one is provided, it can be completely embedded within the rotor and merely supplement the primary flux from the stator to enhance torque. In most cases, where the rotor lacks any permanent magnet, the motor's axial shaft can have a larger diameter and may, together with the rotor, form a linear actuator.

9 Claims, 8 Drawing Sheets

HYBRID STEP MOTOR

CROSS-REFERENCE TO RELATED APPLICATION

This application claims priority under 35 USC 119(e) from U.S. provisional application No. 61/758,534 filed Jan. 30, 2013.

TECHNICAL FIELD

The present invention relates to stepper motors and in particular to step motor designs where a smooth motion is required.

BACKGROUND ART

Low speed vibration is one of the difficult problems in the step motor motion control industry. Applications for step motors that may require smooth motion include scanners, printers, x-y tables, turntables, CNC machines, dispensers, injector pumps, optical equipment such as security cameras, and any precision devices of motion control systems.

The difficulty in controlling vibration is due to strong magnetism in the air gap between rotor and stator, which makes it very difficult to control magnetic flux solely by the Ampere-turns generated from the stator. Accordingly, electronic and mechanical damping has been used to improve the smooth motion.

SUMMARY DISCLOSURE

Smoother motion is achieved by recognizing that difficult to control magnetic flux in the air gap is due to the use of a permanent disk magnet in the rotor and that such permanent magnet need not be present in the rotor but can be moved into the stator away from the gap.

In particular, the invention provides enough magnetism from a permanent ring magnet sandwiched between outer portions of two stator stacks. This permanent magnet in the stator, instead of the rotor, is located away from the air gap, that is, in the periphery of the stator outside of the windings. Accordingly, the magnetic flux in the air gap is now dominated instead by the windings. This makes the magnetic flux easier to control using the Ampere-turns magnetic flux generated by the stator windings. Flux interactions at non-energized poles are reduced for smooth motion with less vibration and noise at both low and high stepping speeds. Step accuracy is also improved, because there is less stray flux.

A stepper motor includes a rotor and a stator winding assembly. The rotor has a plurality of rotor teeth and fits so as to rotate within the stator winding assembly, seated by bearings on an axial shaft. The stator winding assembly includes a stator with a set of stator poles with sets of stator teeth. The stator poles are wound with coils that can be driven in a series of phases so as to magnetically interact with the rotor. Additionally, the stator in accord with the present invention is characterized by having a permanent ring magnet that is sandwiched between outer portions of two stator stack elements of the stator outside of the coils. In this way, the magnetic flux in a gap between the respective teeth of the rotor and stator is dominated by the flux generated by the Ampere-turns of energized stator coils, with reduced flux interactions from the non-energized poles of any given phase.

A step motor including a rotor and two stacks of the stators. The rotor can be two stacks offset ½ of the tooth pitch, while the two stator stacks have their stator teeth in-line with one another. Alternatively, the rotor can be one stack, while the two stator stacks are assembled so that they offset by ½ of the tooth pitch. The step motor includes a permanent magnet shaped to conform to the stator yoke, positioned outside of the stator winding, and sandwiched by the two stator stacks. There need be no permanent magnet inside the rotor.

The rotor may comprise rotor stack elements with teeth offset by one-half tooth pitch with respect to one another, with corresponding stator stack elements having stator teeth in-line with one another. Alternatively, the stator stack elements may have stator teeth offset by one-half tooth pitch with respect to one another, while the rotor is a single element with in-line rotor teeth.

The permanent ring magnet preferably has a shape that conforms to the stator stack elements. The stator may further have a non-metallic spacer sandwiched between the stator stack elements and positioned inside the permanent ring magnet. Usually, the rotor lacks any permanent magnet.

The magnetism from the permanent magnet can be controlled by the Ampere-turns generated from the stator, thus providing a smooth motion. All the magnetic flux will follow with the energized stator pole(s). There need not be, and normally there is not, any permanent magnet inside the rotor. This allows one to build a smaller size of the motor and still maintain a reasonable torque. Consequently higher torque per inertia motor can be obtained for faster acceleration. Additionally, because the magnet flux path is reduced, the motor will be more efficient.

Alternatively, one can accept a larger diameter of the shaft (or hollow shaft). In the stepper motor, the diameter of the axial shaft is no longer limited by a need for the presence of a permanent ring magnet in the rotor. Accordingly, the size of the axial shaft may have a diameter that is at least half as large as a diameter of the rotor. This leads to several new possibilities wherein the rotor and axial shaft together form a linear actuator, such as any one of a leadscrew, ball screw, and planetary roller screw, whereby rotation of the rotor is translated into linear motion of the axial shaft. Thus, the linear actuator formed by combination of the rotor and axial shaft could be a ball screw, with the rotor defining a ball nut that contains ball bearings recirculated by a ball return system, and with the axial shaft defining a screw with a helical groove race engaging the ball bearings within the ball nut.

BRIEF DESCRIPTION OF THE DRAWINGS

FIG. 2A is a side sectional view of a first embodiment of a step motor in accord with the present invention, including a permanent ring magnet (seen in plan view in FIG. 2B) for the stator. In FIG. 2A, offset teeth are on the rotor and in-line teeth are on the stator poles.

FIG. 3A is a side sectional view of a second embodiment of a step motor in accord with the present invention, including a permanent ring magnet (seen in plan view in FIG. 3B) for the stator. In FIG. 3A, in-line teeth are on the rotor and offset teeth are on the stator poles.

FIG. 5A is a side sectional view of a fourth embodiment of a step motor in accord with the present invention, including a permanent ring magnet (seen in plan view in FIG. 5B) for the stator. A permanent ring magnet (seen in plan view in FIG. 5C) is also embedded within the rotor.

DETAILED DESCRIPTION

Figure 1A:
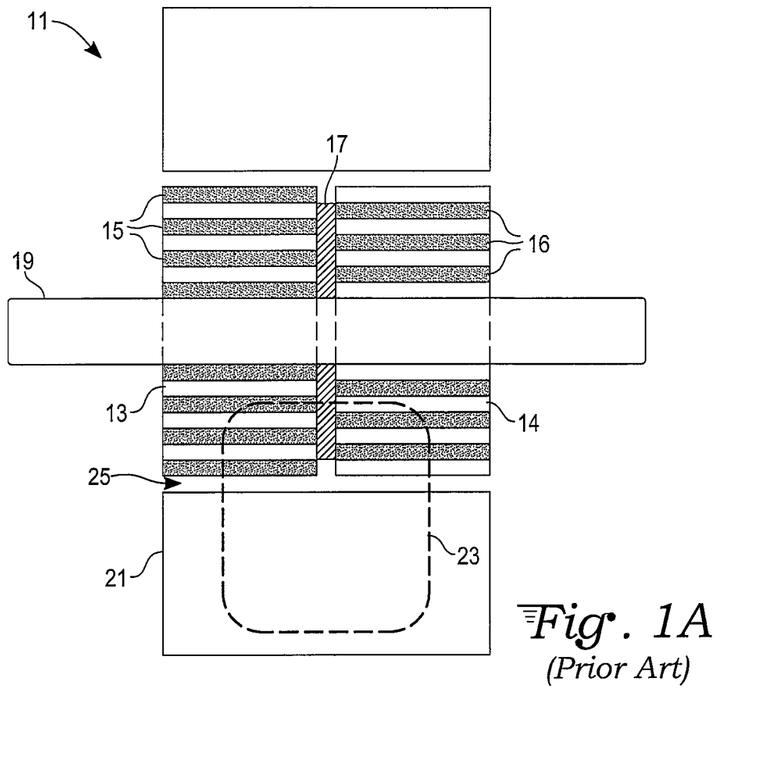
FIG. 1A is a side sectional view of a step motor of the prior art, including a permanent ring magnet for the rotor, seen in plan view in FIG. 1B.
Figure 1B:
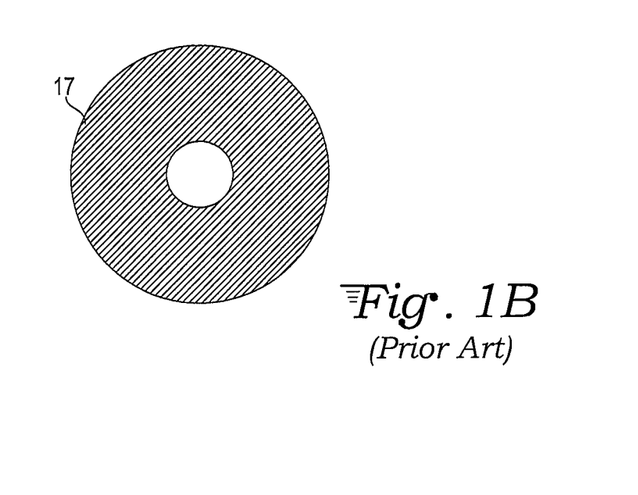

With reference to FIGS. 1A and 1B, a conventional step motor design uses a two rotor stacks 13 and 14 with respective rotor teeth 15 and 16 offset by of the tooth pitch and sandwiching a disc permanent magnet 17 between the stacks 13 and 14. This rotor is mounted on an axial shaft 19. A stator assembly 21 is also provided which uses a single stator stack including coil windings defining stator poles having stator teeth that magnetically interact with the counterpart rotor teeth opposite a gap 25. A magnetic flux path 23 due to the permanent magnetic disc of the rotor is seen crossing the gap 25. This makes the magnetic interaction difficult to control by the energized stator windings, because the flux in the gap 25 is dominated by the flux contribution 23 from the permanent magnet 17, leading to undesired vibrations when stepping at low speeds.

Figure 2A:
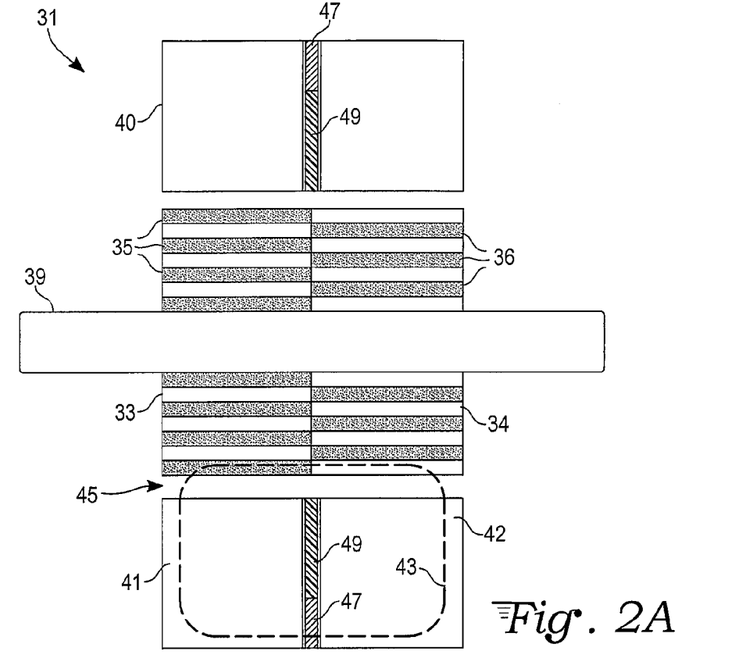
Figure 2B:
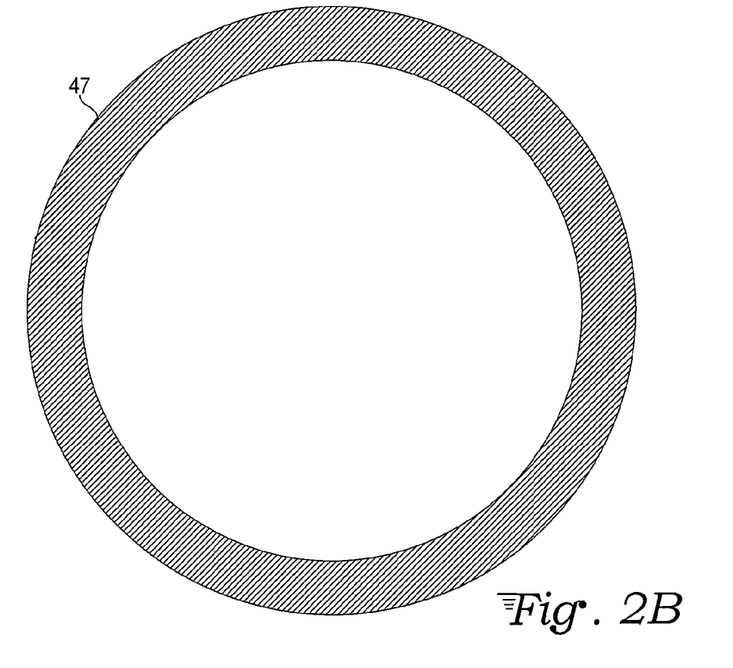
Figure 6:
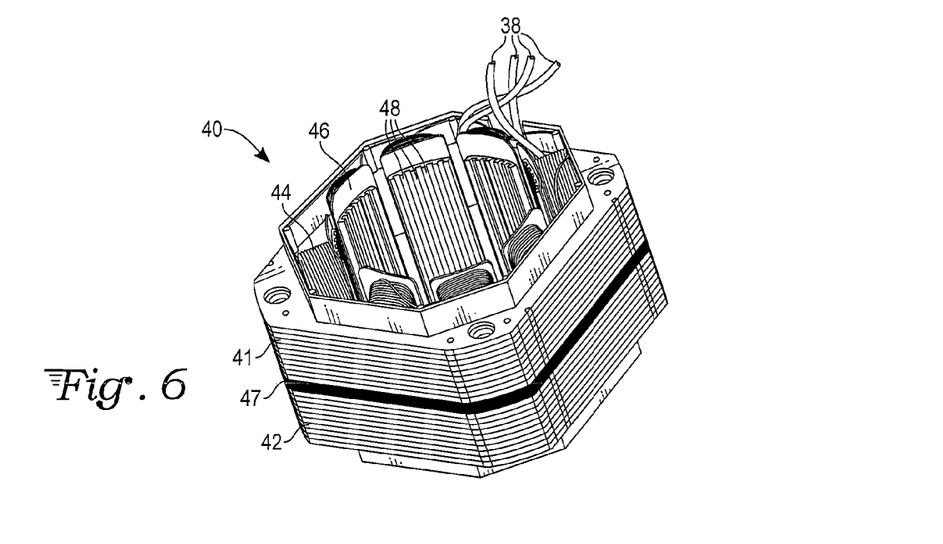
FIG. 6 is a perspective view of a stator assembly for a step motor in accord with the present invention.

With reference to FIGS. 2A and 2B, an embodiment of a step motor 31 in accord with the present invention moves the permanent magnet 47 to the periphery of the stator assembly 40. Again, two rotor sections 33 and 34 have respective rotor teeth 35 and 36 offset by of the tooth pitch, but here the sections 33 and 34 do not sandwich any permanent disc magnet. This rotor is mounted on an axial shaft 39. In a stator assembly 40 (see also FIG. 6) a ring magnet 47 is sandwiched by two stator stacks 41 and 42. A nonmetallic spacer 49 may be located within the radial interior of the ring magnet 47 and also sandwiched by the stator stacks 41 and 42. As is typical of step motor stator assemblies, coil windings 44 (see FIG. 6) coupled to external wires 38 are provided around a set of stator poles 46, the poles 46 having stator teeth 48 that magnetically interact with the counterpart rotor teeth 35 and 36 opposite a gap 45. The stator teeth 48 in both stack sections 41 and 42 are aligned in this case. The ring magnet 47 conforms to the shape of the stator stacks 41 and 42, which in this example corresponds to the magnet shape seen in FIG. 7A. A magnetic flux path 43 due to the permanent ring magnet 47 of the stator is seen crossing the gap 45, but because the ring magnet 47 is distal from the gap 45, the magnetic flux in the gap 45 is now dominated by the energized stator coils 44, thereby allowing for increased control of the stepping and less vibration.

Figure 3A:
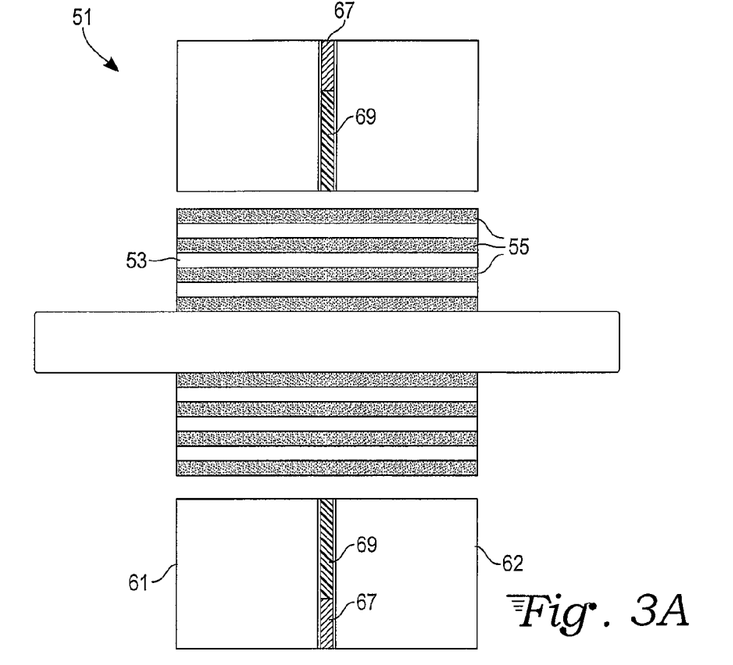
Figure 3B:
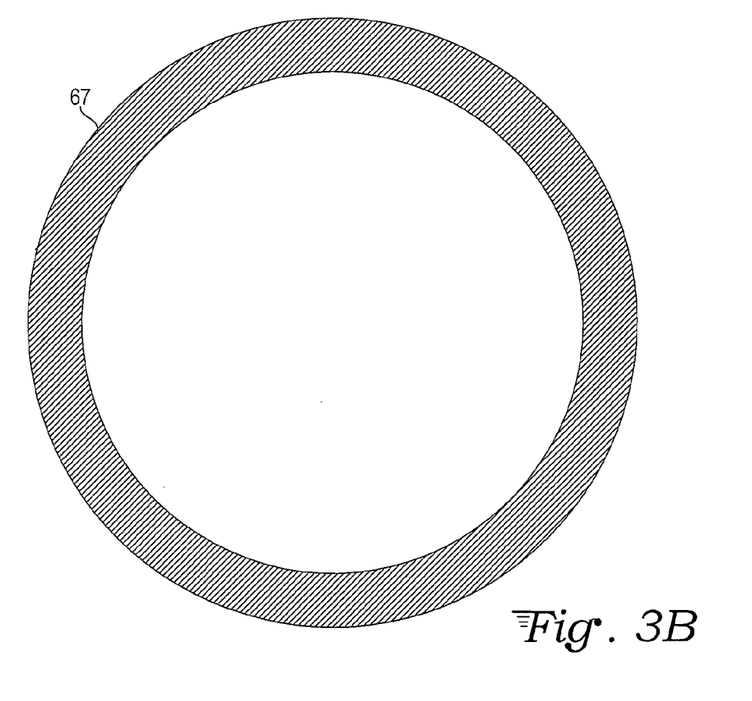

FIGS. 3A and 3B show another embodiment of a step motor 51 in which a single rotor section 53 has a single set of aligned rotor teeth 55. Again, no permanent magnet is embedded within the rotor. In a stator assembly, a ring magnet 67 is sandwiched by two stator stacks 61 and 62. A non-metallic spacer material 69 is used to separate between the stator poles. The stator assembly again has coil windings around stator poles, with stator teeth on such poles, which in this case are offset from each other by ½ of the stator tooth pitch. Thus, while the rotor and stator both have teeth and the teeth on one are in-line and those on the other have two sets of teeth that are offset by ½ tooth pitch, which of the rotor or stator has the offset teeth and which has the in-line teeth is essentially irrelevant. In FIGS. 2A and 2B it is the rotor that has the two sets of offset teeth and the stator has the in-line teeth, while in FIGS. 3A and 3B the arrangement is reversed. In both embodiments it is the location of the permanent magnet in the stator at a peripheral location far away from the rotor-stator gap that characterizes an improvement of the present invention.

Figure 4A:
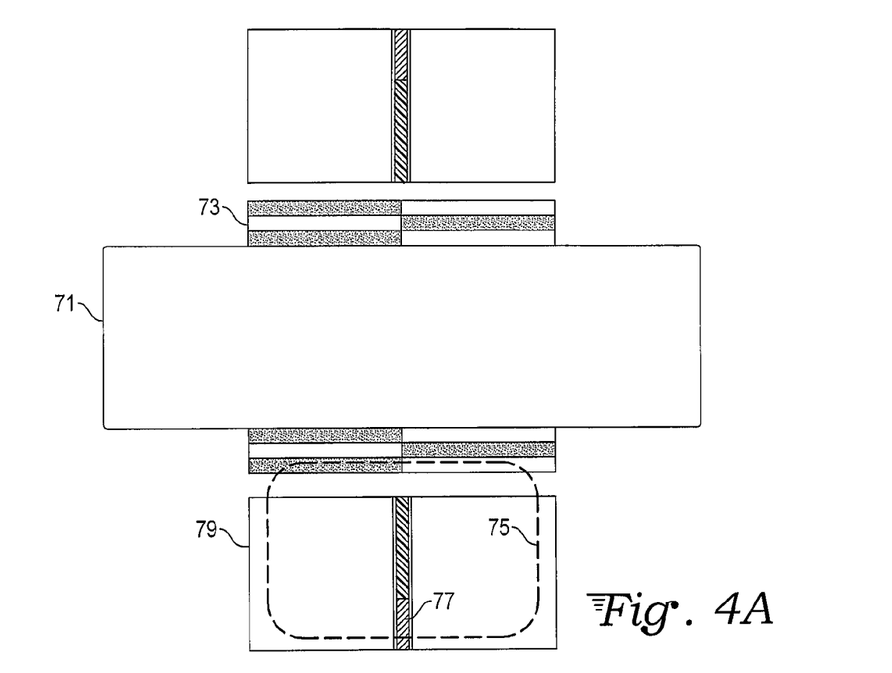
FIG. 4A is a side sectional view of a third embodiment of a step motor in accord with the present invention, including a permanent ring magnet (seen in plan view in FIG. 4B) for the stator. The axial shaft attached to the rotor is seen to have a diameter at least half as large as a diameter of the rotor.
Figure 4B:
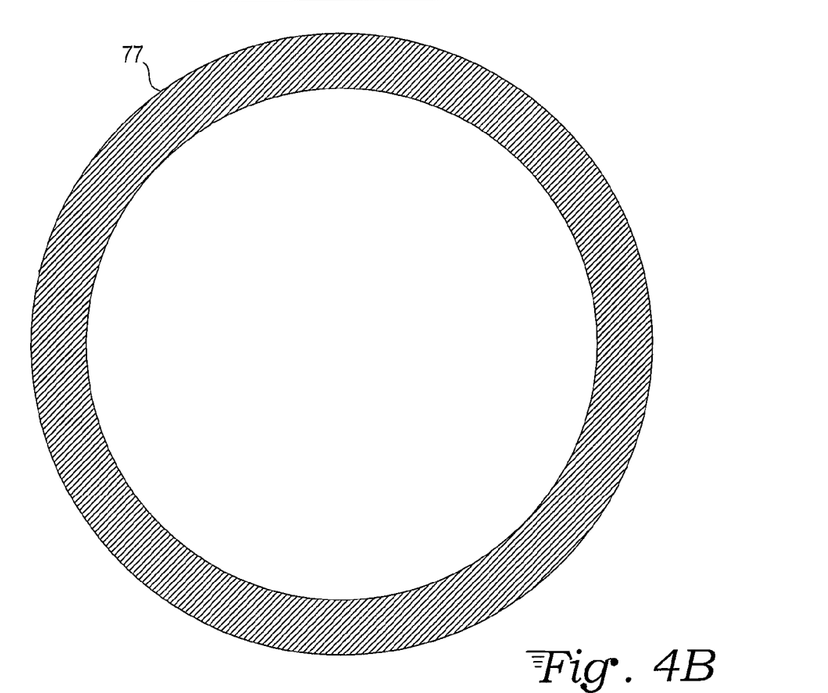

FIGS. 4A and 4B show an additional advantage to locating the permanent magnet 77 within the stator 79 instead of in the rotor 73. In particular, unlike prior step motor designs as in FIG. 1, the diameter of the axial shaft is no longer limited by the need to accommodate a disc magnet in the rotor. Therefore, for special applications, the rotor 73 can accept a shaft 71 with a larger diameter (including a hollow shaft and also the ball screw linear actuator described below for the stepper of FIGS. 7 and 8). The magnetic flux 75 from the permanent magnet 77 in the stator will interact remotely with the rotor 73.

Figures 5A, 5C:
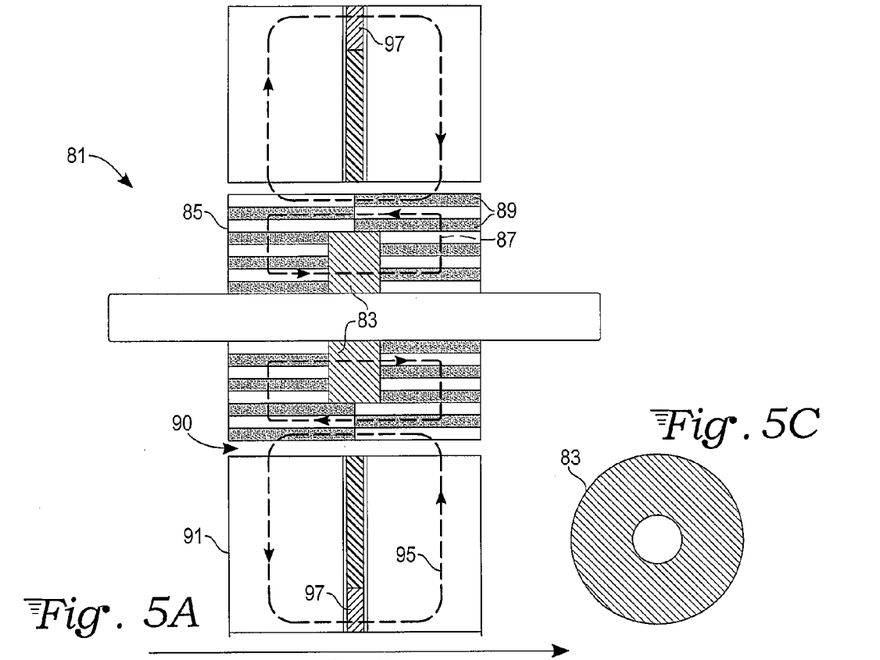
Figure 5B:
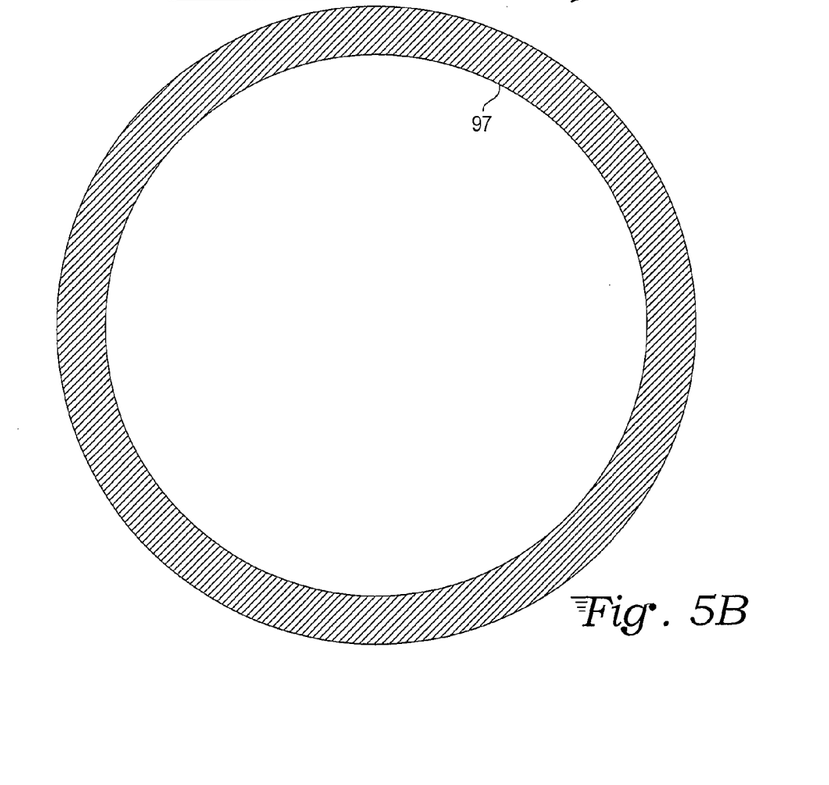

FIGS. 5A, 5B and 5C show yet another stepper motor 81 in accord with the present invention that illustrates optional use of a permanent magnet 83 embedded in the interior of the rotor 85 in addition to the permanent ring magnet 97 provided in the stator 91. The two magnets 83 and 97 have opposite magnetization direction so that their respective flux contributions 87 and 95 reinforce one another in the vicinity of the rotor teeth 89 to provide extra holding torque for those step motor applications that may require it. In order to still maintain as much of the vibration reduction benefit of the present invention as possible, the optional magnet 83 in the rotor 81 should be completely embedded with an outer diameter interiorly situated as far as possible away from the rotor teeth 89.

Improving torque and improving step accuracy are normally conflict to each other. The configuration in FIGS. 5A-5C overcomes the difficulty by keeping standby flux 87 from the rotor's disk magnet 83 inside the rotor 85 and not in the gap 90 between rotor and stator teeth. This standby flux 87 only adds to the primary flux 95 from the stator and controlled by the Ampere-turns in the energized stator coils. Thus, this design adds torque and still maintains good step accuracy.

The magnitude of the standby flux may be set at the factory so as to remain completely inside of the rotor, with no flux linkage to the primary flux 95, an "equilibrium situation" that exists when there is no load on the spindle. When a load is applied above a threshold amount, the spindle speed tries to go down. This is automatically sensed in the rotor-stator and current to the stator needs to be increased (increasing ampere-turns). Current to the stator would be increased by resistive needs of the circuit, increasing ampere-turns and maintaining the new equilibrium situation, until disturbed again.

It also works well for micro-stepping. The standby flux will only provide the necessary amount of the flux for higher torque but not mess up the proper flux ratio (to match current ratio) for micro-stepping.

Figure 7A:
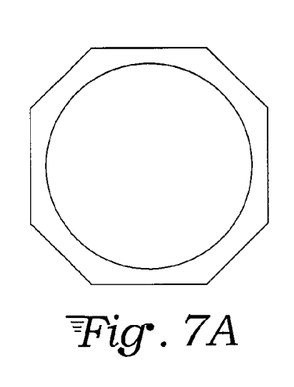
FIGS. 7A-7C show plan views of three different example shapes of permanent ring magnets that could be used in the stator, depending on the peripheral shape of such stator, such that the ring magnet conforms to the shape of the stator.
Figure 7B:
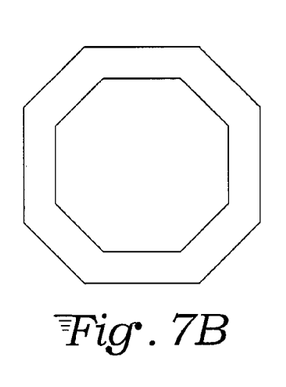
Figure 7C:
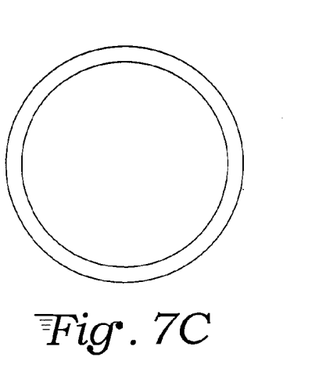

FIGS. 7A, 7B and 7C show different shapes of permanent ring magnets which could be used in different shaped stators.

Generally, it is desired that the magnet match the contour of the stator yoke.

Figure 8:
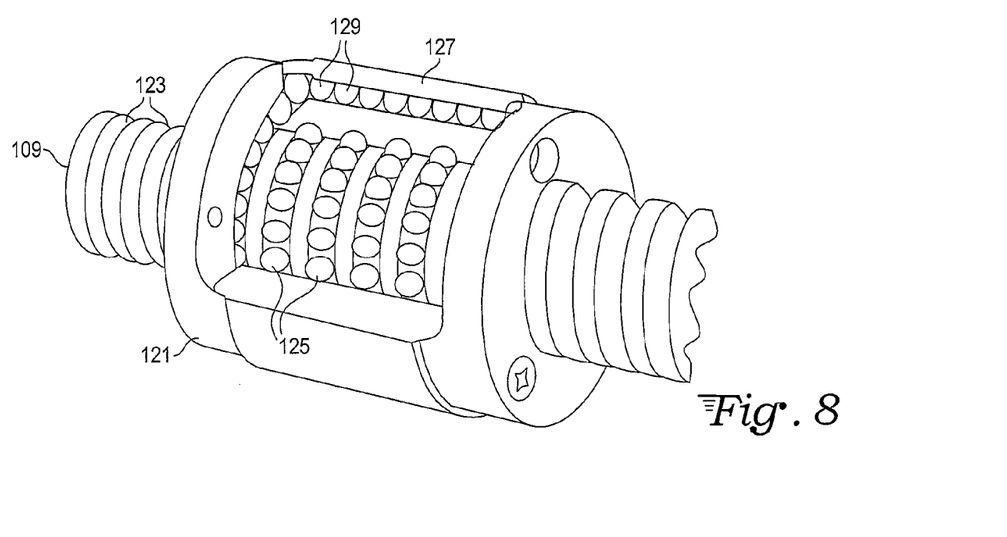
FIG. 8 is a perspective view of one example of a rotor and axial shaft that together form a linear actuator, in this case, a ball screw.
Figure 9:
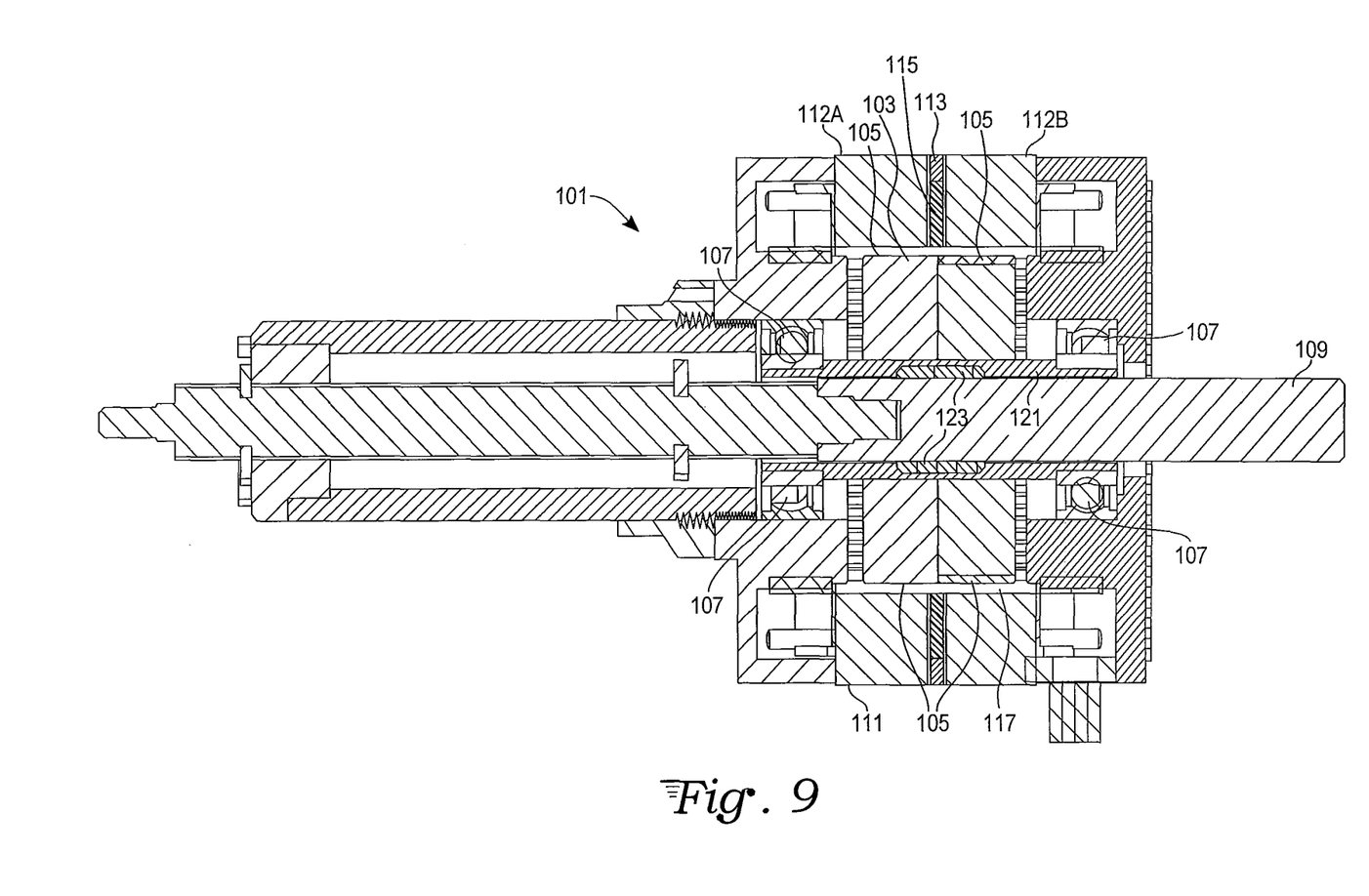
FIG. 9 is a side sectional view of a fifth embodiment of a step motor incorporating the linear actuator of FIG. 8.

With reference to FIGS. 8 and 9, a step motor 101 in accord with the present invention forms a hybrid linear actuator. As in the other embodiments, the motor 101 has a rotor 103 with a plurality of rotor teeth 105. The rotor 103 fits within a stator winding assembly 111 and is seated by bearings 107 on an axial shaft 109 so as to rotate within the stator winding assembly 111. As in conventional stepper motors, the stator winding assembly 111 includes a stator with a set of stator poles wound with coils that can be driven in a series of phases so as to magnetically interact with the rotor 103. As in the embodiments of the present invention, the stator is characterized by having a permanent ring magnet 113 sandwiched between outer portions of two stator stack elements 112A and 112B. A nonmetallic spacer element 115 may also be sandwiched between the stacks interior of the permanent ring magnet 113. Magnetic flux in an air gap 117 between the rotor and stator teeth is dominated by the flux generated by Ampere-turns of energized stator coils with reduced flux interactions from non-energized poles.

In the illustrated example, a ball screw is formed from the rotor 103 and axial shaft 109. Similar embodiments employing a leadscrew or planetary roller screw are also possible. In any of these cases, rotation of the rotor 103 is translated into linear motion of the axial shaft 109. This is made possible by the elimination of the need for a permanent disk magnet in the rotor 103, freeing up space for the enlarged shaft 109 of the linear actuator. Thus, the linear actuator formed by combination of the rotor 103 and axial shaft 109 could be a ball screw, with the rotor 103 defining a ball nut 121 that contains ball bearings 129 recirculated by a ball return system 127, and with the axial shaft 109 defining a screw with a helical groove race 123 engaging the ball bearings 125 within the ball nut 121. The nut 121 of the ball screw is installed inside of the rotor 103. The size of the ball nut 121, previously limited by the inner diameter of the disk magnet used in the rotor 103, is no longer so limited.

Figure 10:
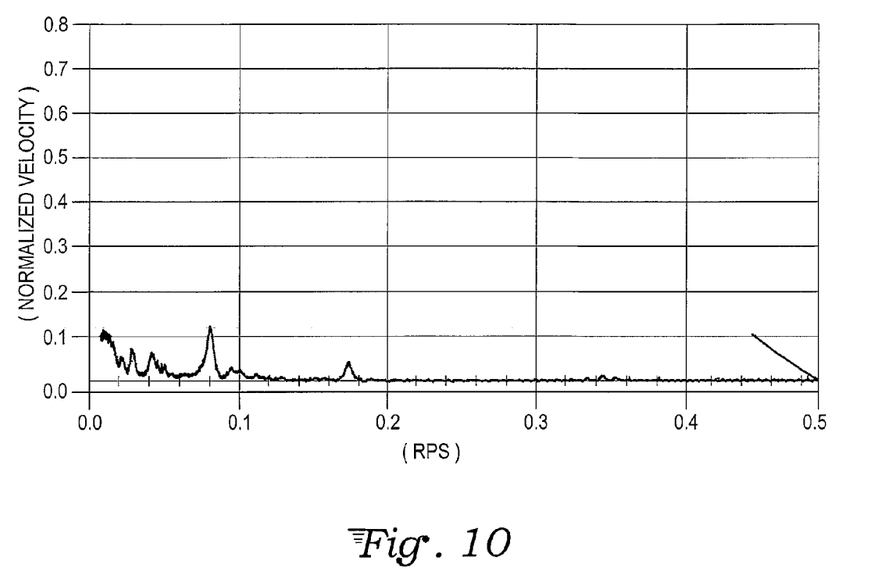
FIG. 10 is graph of normalized velocity as a function of step motor rotations per second (RPS) for a 64-microstep-driven 0.9° step motor with permanent ring magnet in the stator in accord with the present invention.
Figure 11:
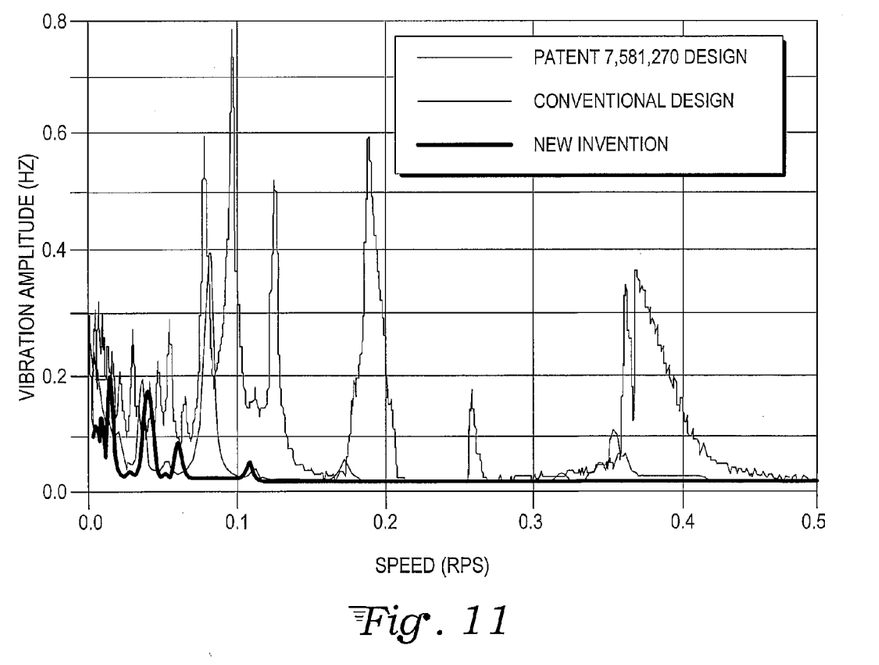
FIG. 11 is a graph of vibration amplitude versus step motor speed (RPS) for three different types of motor comparing results for two prior art motors and one motor of the present invention.

FIGS. 10 and 11 show that vibration is reduced because of locating the permanent magnet in the stator. In FIG. 10, normalized velocity as a function of step motor rotations per second (RPS) for a 64-microstep-driven 0.9° step motor with permanent ring magnet in the stator in accord with the present invention has very few peaks at low RPS. In FIG. 11, vibration amplitude versus step motor speed (RPS) for three different types of motor shows that vibration (noise) is far less for the motor of the present invention with the permanent magnet in the stator compared to that for two prior art motors where the permanent magnet is in the rotor. (Note the large amplitude peaks for the conventional motors.)

What is claimed is:

1. A stepper motor, comprising:
a rotor with a plurality of rotor teeth, the rotor fitting within a stator winding assembly and seated by bearings on an axial shaft so as to rotate within the stator winding assembly; and
the stator winding assembly including a stator with a set of stator poles wound with coils that can be driven in a series of phases so as to magnetically interact with the rotor, the stator poles having sets of stator teeth that are selectively magnetized by energizing of the stator coils, the stator characterized by having a permanent ring magnet sandwiched between outer portions of two stator stack elements of the stator outside of the coils, the permanent ring magnet having a ring interior with magnetic flux from the permanent ring magnet passing axially through the ring interior to remotely magnetize the rotor and its rotor teeth, such that magnetic flux in an air gap between rotor and stator teeth is dominated by the flux generated by Ampere-turns of energized stator coils with reduced flux interactions from non-energized poles.

2. The stepper motor of claim 1, wherein the rotor comprises rotor stack elements with teeth offset by one-half tooth pitch with respect to one another, and wherein the stator stack elements have stator teeth in-line with one another.

3. The stepper motor of claim 1, wherein the stator stack elements have stator teeth offset by one-half tooth pitch with respect to one another, and wherein the rotor is a single element with in-line rotor teeth.

4. The stepper motor of claim 1, wherein the permanent ring magnet has a shape that conforms to an outer perimeter of the stator stack elements.

5. The stepper motor of claim 1, wherein the stator further has a non-metallic spacer sandwiched between the stator stack elements and positioned inside the permanent ring magnet.

6. The stepper motor of claim 1, wherein the rotor lacks any permanent magnet.

7. The stepper motor of claim 1, wherein the axial shaft has a diameter that is at least half as large as a diameter of the rotor.

8. The stepper motor of claim 1, wherein the rotor and axial shaft together form a linear actuator comprising any one of a leadscrew, ball screw, and planetary roller screw, whereby rotation of the rotor is translated into linear motion of the axial shaft.

9. The stepper motor of claim 8, wherein the linear actuator formed by combination of the rotor and axial shaft is a ball screw, with the rotor defining a ball nut containing ball bearings recirculated by a ball return system, and with the axial shaft defining a screw with a helical groove race engaging the ball bearings within the ball nut.

* * * * *